United States Patent [19]

Picone et al.

[11] Patent Number: 4,782,730
[45] Date of Patent: Nov. 8, 1988

[54] STRADDLING GASKET CUTTER

[76] Inventors: John Picone, 195 Quebec Rd., Island Park, N.Y. 11558; Thomas W. Timmins, Jr., 166 Lake Ave., Staten Island, N.Y. 10303

[21] Appl. No.: 935,387
[22] Filed: Nov. 26, 1986
[51] Int. Cl.[4] .................. B26D 5/00; B27B 3/00; B27B 5/18; B26B 3/00
[52] U.S. Cl. ........................ 83/745; 30/300; 30/304; 30/310
[58] Field of Search ............... 83/745; 30/300, 304, 30/310

[56] References Cited

U.S. PATENT DOCUMENTS 2,134,069 10/1938 Zimmerman .................. 30/300
2,986,814 6/1961 Brinkman .................. 30/300

Primary Examiner—E. R. Kazenske
Assistant Examiner—Scott A. Smith
Attorney, Agent, or Firm—Gilbert L. Wells

[57] ABSTRACT

A gasket cutting assembly for cutting an inner diameter and an outer diameter of a gasket simultaneously. The assembly has a rectangular bar base portion with a longitudinal slot therein and a blade at one end. An L-shaped adapter arm with a second blade at the L-shaped end also has a longitudinal slot and the arm and base are attached to one another by a bolt through the longitudinal slots. Graduations on the base and arm facilitate settings of the blades for cutting the internal and outside diameters of a gasket simultaneously.

5 Claims, 2 Drawing Sheets

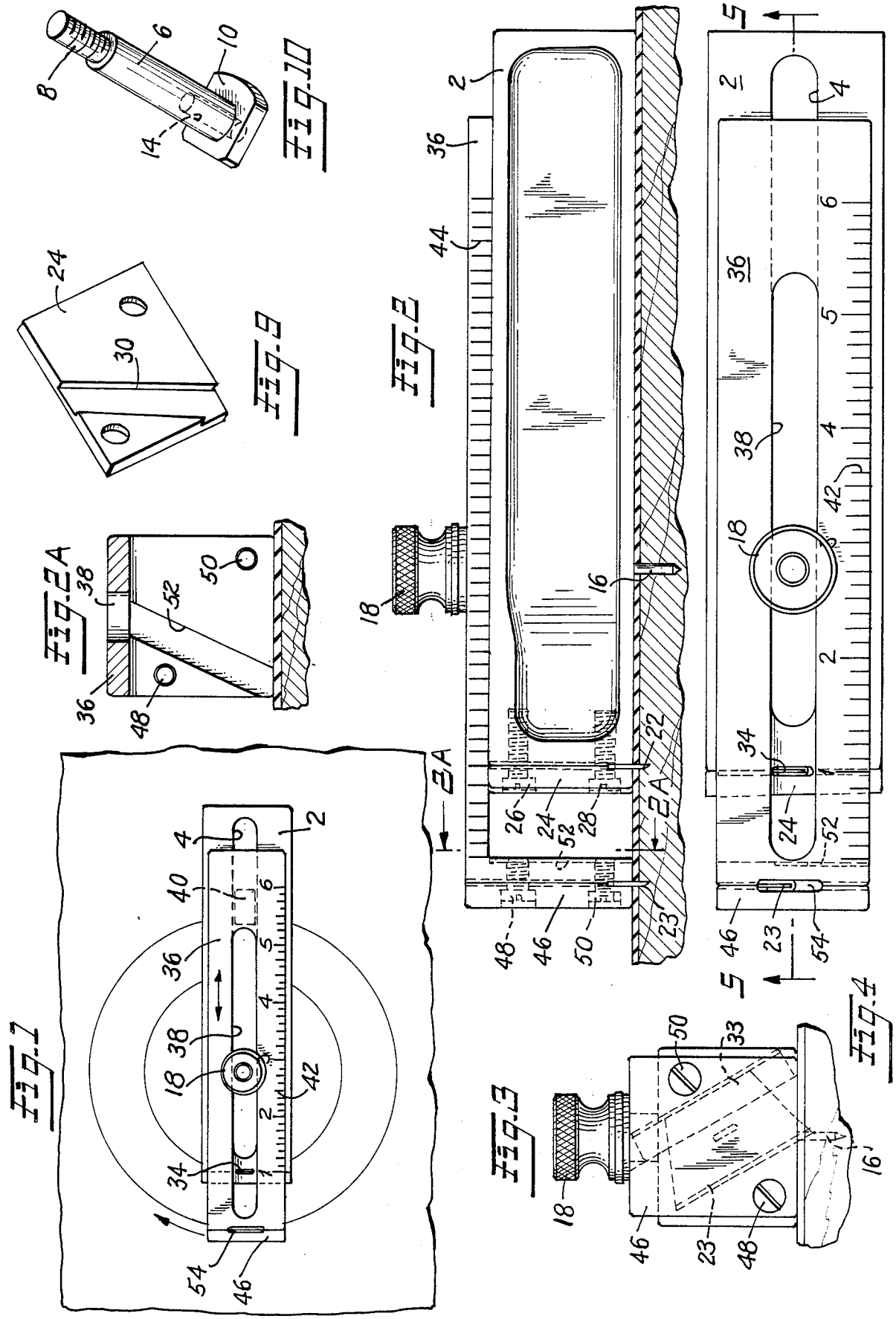

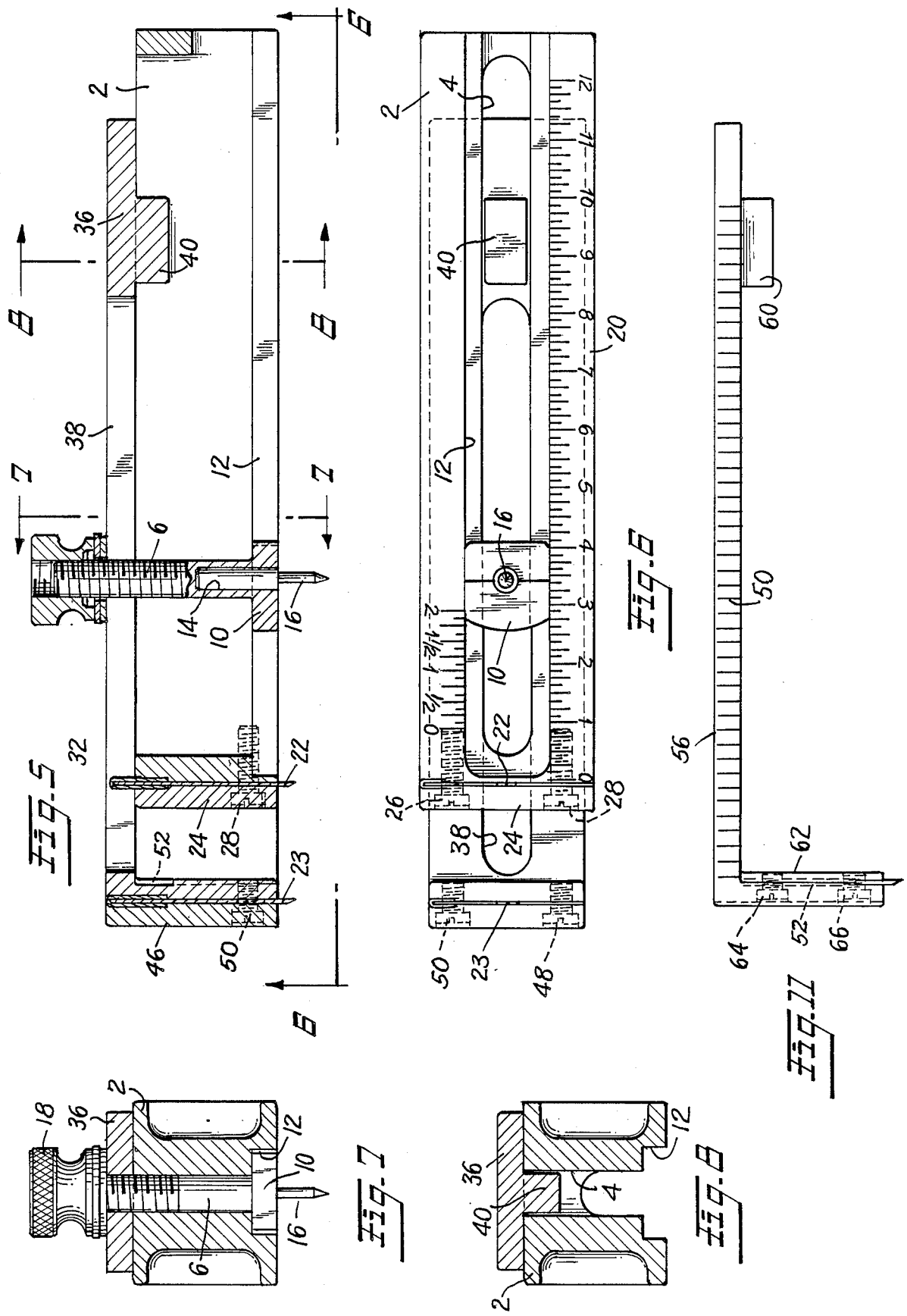

STRADDLING GASKET CUTTER

CROSS-REFERENCE TO A RELATED APPLICATION

Applicants filed Disclosure Document No. 145,361 on Feb. 6, 1986, in the United States Patent and Trademark Office.

BACKGROUND OF THE INVENTION

The field of the invention is curved line scribers having a cirle-pin and jointed arm and the present invention is particularly concerned with an improvement over the ALL-PAX Gasket Cutter used for making single 360° circular cuts from gasket material.

According to the prior art ALL-PAX type gasket cutters, single circular cuts are made in gasket materials using a scriber having a slotted bar, a razor blade mounted at one end and a pivot pin adjustably mounted in the slot of the bar. The slot has a scale and the pivot pin is adjusted to a given radius of cutting. For gaskets having an internal diameter and an outside diameter it is necessary with this prior art device to first cut one circle, adjust the radius of the circle for the second cut, and then make a second cut.

A disadvantage of this prior art device is the distortion in the gasket material which is the result of two successive cuts being made on the same material.

In the manufacture of gaskets with the prior art gasket cutter a wooden cutting board is advantageously used. This cutting board has a stationary receiving pivot point which is adapted to accept the pin of the cutter. Such a cutting board is used to advantage in the present invention.

The gasket materials are normally paper, rubber and polymer sheeting such as TEFLON, etc.

SUMMARY OF THE INVENTION

Having in mind the limitations of the prior art it is an object of the present invention to provide a gasket cutter which simultaneously cuts two concentric circles in gasket material and thereby generates a gasket with an O.D. (Outside Diameter) and an I. D. (Internal Diameter) in one operation.

This object is achieved in the present invention by adapting the prior art ALL-PAX Gasket Cutter by adding an extension cutting arm thereto.

The manually operated ring gasket cutter of the present invention is comprised of two main parts, an upper half and lower half. The lower half is the heavier body member (ALL-PAX ANKORITE - or similar) gasket cutter which houses its own blade and has a functional graduated scale on its bottom. The upper half (adapter) is an attachment comprising its own blade and it too has a functional graduated scale on its top. The upper and lower halves combined define a new unit which, in use, allows an individual to cut the inner and outer diameters of a ring gasket simultaneously from desired material (e.g. rubber, asbestos, teflon, paper, etc.). The new combination is an effective way to cut thousands of various combinations of ring gaskets both small and large.

BRIEF DESCRIPTION OF THE DRAWINGS

The present invention may best be explained by reference to the appended drawings, wherein:

FIG. 1 is a fragmentary plan view of the gasket cutter of the present invention;

FIG. 2 is an enlarged side elevational view, partly in section, of the gasket cutter of FIG. 1;

FIG. 2a is a vertical view, partly in section, taken on the line 2A—2A of FIG. 2;

FIG. 3 is an end view of the gasket cutter as viewed from the left of FIG. 2;

FIG. 4 is a plan view of the gasket cutter of FIG. 2;

FIG. 5 is a vertical sectional view, taken on the line 5—5 of FIG. 4;

FIG. 6 is a bottom plan view of the gasket cutter of FIG. 5;

FIG. 7 is a transverse vertical sectional view, taken on line 7—7 of FIG. 5;

FIG. 8 is a transverse vertical sectional view, taken on the line 8—8 of FIG. 5;

FIG. 9 is a perspective view of the cutter blade assembly plate;

FIG. 10 is a perspective view of a modified slide bolt; and

FIG. 11 is a side view of another embodiment of the adapter arm of FIG. 2 wherein the cutter blade assembly plate is mounted to the rear.

DESCRIPTION OF THE PREFERRED EMBODIMENTS

The present invention is shown with particular reference to FIGS. 1 through 4, wherein the state of the art single gasket cutter base 2 has a key slot 4 adapted to receive a slide bolt 6 (FIG. 10) having a threaded first end 8 and a second end 10 with two flat, parallel sides adapted to slide in second key slot 12.

Bolt 6 has a recess 14 adapted to receive a centering pin 16 and the bolt is held in longitudinally adjustable positions by center-pin locking thumbscrew nut 18.

As shown in FIG. 6, the gasket cutter base has a scale 20 for establishing the inner diameter of a gasket being cut.

A blade 22 is adjustably secured in place by cover plate 24 and flat head screws 26, 28. Cover plate 24 has a diagonal groove 30 adapted to receive and guide the head 32 of blade 22. The head 32 protrudes from the top of the gasket cutter base at 34.

Adapter arm 36 has a key slot 38 parallel to key slot 4 of the cutter base and near the rear end a key 40 for guidance in key slots 4 and 38. Scales 42 and 44 are machined into the top and side respectively of the adapter arm.

Cover plate 46 adapted to adjustably secure a second blade 23 to the head of the adapter arm is held in position by flat head bolts 48, 50. The blade head 33 is secured in adjustable diagonal groove 52 and the blade can protrude at 54.

In the embodiment of FIG. 11 the adapter arm 56 has a side scale 58, a key 60, and a cover plate 62 mounted on the inside of the head by flat head screws 64, 66.

BEST MODE FOR CARRYING OUT THE INVENTION

The concept is to cut a gasket faster, neater and easier than ever possible before. The adapter has its own blade and graduated scale and converts the single blade gasket cutter to a dual-blade system. With blades running parallel to each other and set to precise distances, an individual can cut a ring gasket with just one turn application and produce a clean, highly accurate gasket. The adapter makes it possible to cut smaller and larger gaskets in different proportions that are just too hard or impossible to do with a one-blade system.

This particular embodiment is machined from brass stock and is an accurate and quite rigid tool. Its features include an easily readable scale displayed both on top and on the side of the adapter with graduations to 8ths of an inch. The scale reads from one quarter inch to six inches for easy adjustment. The adapter contains its own blade that is adjusted and locked in place in the same manner as the prior art ALL-PAX Gasket Cutter. The adapter mounts directly on top of the gasket cutter and a key located on the underside of the adapter acts as a guide and provides stability when affixed into the slot on top of the gasket cutter. The center-pin locking thumbscrew holds both the gasket cutter and adapter together when in the cutting mode. An optional razor blade cover plate and screws are provided to replace the existing ALL-PAX Gasket Cutter razor blade cover plate. The plate is purposely made thinner because it allows the adapter to get closer to the center making it possible to cut very narrow gaskets.

A new blade is affixed into the head of the adapter in the same fashion as one would for the ALL-PAX Gasket Cutter. A new second blade is affixed into the ALL-PAX Gasket Cutter head and the existing blade hold down plate is replaced with a new thinner plate and is tightened in place with flat head screws. Now, the adapter arm is placed on top of the gasket cutter and one takes care that the key is riding in the track or slot and can slide back and forth freely. The length of the blades is checked making sure that they are approximately the same length and corrected if necessary. The center-pin screw assembly is inserted through both the ALL-PAX Gasket Cutter and the adapter arm. This center pin screw assembly is used to lock both the gasket cutter and adapter together and provide the center pivot point for the two.

The adapter arm slides independently from the gasket cutter when the thumb screw is loosened. This allows adjustment or swing from center for the adapter which will cut the O.D. (Outer Diameter) of the gasket. The ALL-PAX Gasket Cutter is set for the I.D. (Internal Diameter) of the gasket. With the adapter set and the gasket cutter set, the unit is placed onto a fixed pin on a cutter board and a complete gasket is cut in just one application. The scale on the adapter arm is derived from the two closest points of both blades. This is the position where the adapter is fully retracted and butted closed against the head of the gasket cutter. This distance is one quarter inch. This is the starting point of the adapter and also is the first line on the scale. This aligns with the inner blade of the ALL-PAX Gasket Cutter. All adjustments of the scale are read at this point at all times to achieve an accurate cut from the adapter which is to cut the outer diameter of the gasket. Inner Diameter cutting is achieved from the gasket cutter base.

We claim:

1. A gasket cutting assembly for cutting an inner diameter and an outer diameter of a gasket simultaneously, comprising:
    (a) a rectangular bar base having a first longitudinal slot therein;
    (b) means for securing a first cutting blade at one end of said rectangular base;
    (c) an L-shaped adapter arm having a second longitudinal slot therein parallel to said first longitudinal slot;
    (d) means for securing a second cutting blade at said L-shaped end of said adapter arm;
    (e) means mounted in said first and second longitudinal slots for adjusting the distance between said first blade and said second blade comprising a bolt having a first threaded end, a second end with two flat, parallel sides and an adjustable thumb screw on said threaded end;
    (f) a recess adapted to receive a pivot point in said second end of said bolt;
    (g) said rectangular base having a third longitudinal slot therein parallel to said first slot and wider than said first slot and adapted to guide said two flat, parallel sides; and
    (h) a key comprising two flat, parallel sides mounted on an end opposite said L-shaped end of said adapter arm and adapted to slide in said first longitudinal slot, each of said sides of said key being in mating relationship with inside walls of said first longitudinal slot whereby said L-shaped adapter arm remains in aligned parallel relation with said rectangular base.

2. The gasket cutting assembly of claim 1, wherein a first graduated scale is integral with said rectangular base and a second graduated scale is integral with said L-shaped adapter arm.

3. The gasket cutting assembly of claim 2, wherein said means for securing a first cutting blade at one end of said rectangular base comprise a cover plate, a diagonal groove on the inside of the cover plate adapted to receive said first cutting blade and flat head screws for securing said cover plate to said rectangular base.

4. The gasket cutting assembly of claim 3, wherein said means for securing a second cutting blade at said L-shaped end comprise a second cover plate, a diagonal groove on the inside of said second cover plate adapted to receive said second cutting blade and flat head screws for securing said second cover plate to the outside of said L-shaped end.

5. The gasket cutting assembly of claim 3, wherein said means for securing a second cutting blade at said L-shaped end comprise a second cover plate, a diagonal groove on the inside of said second cover plate adapted to receive said second cutting blade and flat head screws for securing said second cover plate to the inside of said L-shaped end.

* * * * *

UNITED STATES PATENT AND TRADEMARK OFFICE
CERTIFICATE OF CORRECTION

PATENT NO. : 4,782,730

DATED : November 8, 1988

INVENTOR(S) : John Picone & Thomas W. Timmins, Jr.

It is certified that error appears in the above-identified patent and that said Letters Patent is hereby corrected as shown below:

In the drawings:

Figure 11, for "50" read --58--

Signed and Sealed this

Sixth Day of March, 1990

Attest:

JEFFREY M. SAMUELS

Attesting Officer

Acting Commissioner of Patents and Trademarks